United States Patent
Shin et al.

(10) Patent No.: US 12,039,360 B2
(45) Date of Patent: Jul. 16, 2024

(54) OPERATION METHOD OF HOST PROCESSOR AND ACCELERATOR, AND ELECTRONIC DEVICE INCLUDING THE SAME

(71) Applicant: SAMSUNG ELECTRONICS CO., LTD., Suwon-si (KR)

(72) Inventors: Sanggyu Shin, Suwon-si (KR); Yeongsik Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 580 days.

(21) Appl. No.: 17/221,258

(22) Filed: Apr. 2, 2021

(65) Prior Publication Data

US 2022/0075645 A1    Mar. 10, 2022

(30) Foreign Application Priority Data

Sep. 9, 2020    (KR) .......... 10-2020-0115565

(51) Int. Cl.
G06F 9/46        (2006.01)
G06N 3/04       (2023.01)
G06N 5/04       (2023.01)

(52) U.S. Cl.
CPC .......... *G06F 9/466* (2013.01); *G06N 3/04* (2013.01); *G06N 5/04* (2013.01)

(58) Field of Classification Search
CPC . G06F 9/466; G06F 8/443; G06F 9/28; G06F 9/5077; G06N 3/04; G06N 5/04; G06N 3/063; G06N 3/08; G06N 3/045
See application file for complete search history.

(56) References Cited

U.S. PATENT DOCUMENTS

| | | |
|---|---|---|
| 10,019,668 B1 | 7/2018 | Woo |
| 10,083,395 B2 | 9/2018 | Young |
| 2007/0234363 A1* | 10/2007 | Ferrandiz .................. G06F 9/46 718/101 |
| 2009/0030874 A1* | 1/2009 | Das .................... G06F 16/24542 |
| 2010/0153611 A1* | 6/2010 | Rau ..................... G06F 13/1673 710/310 |

(Continued)

FOREIGN PATENT DOCUMENTS

| | | |
|---|---|---|
| JP | 2020-42753 A | 3/2020 |
| WO | WO 2019/160196 A1 | 8/2019 |

OTHER PUBLICATIONS

Shen, Yongming, et al. "Escher: A CNN Accelerator with Flexible Buffering to Minimize Off- Chip Transfer." *IEEE 25th Annual International Symposium on Field-Programmable Custom Computing Machines (FCCM)*, 2017 (8 pages in English).

(Continued)

*Primary Examiner* — Tuan C Dao
(74) *Attorney, Agent, or Firm* — NSIP Law

(57) ABSTRACT

An operation method includes: dividing a model to be executed in an accelerator into a plurality of stages; determining, for each of the stages, a maximum batch size processible in an on-chip memory of the accelerator; determining the determined maximum batch sizes to each be a candidate batch size to be applied to the model; and determining, to be a final batch size to be applied to the model, one of the determined candidate batch sizes that minimizes a sum of a computation cost of executing the model in the accelerator and a memory access cost.

25 Claims, 10 Drawing Sheets

(56) References Cited

U.S. PATENT DOCUMENTS

| | | | | |
|---|---|---|---|---|
| 2011/0288660 | A1* | 11/2011 | Wojsznis | G05B 19/41875 700/30 |
| 2013/0268942 | A1* | 10/2013 | Duluk, Jr. | G06F 9/4881 718/104 |
| 2013/0346931 | A1* | 12/2013 | Murakawa | G06F 30/00 716/108 |
| 2014/0143194 | A1* | 5/2014 | Yoon | G06N 3/049 706/25 |
| 2016/0021385 | A1* | 1/2016 | Chou | H04N 19/513 375/240.16 |
| 2016/0171344 | A1* | 6/2016 | Chen | G06F 18/2148 382/224 |
| 2017/0068889 | A1 | 3/2017 | Fougner et al. | |
| 2019/0122107 | A1 | 4/2019 | Young | |
| 2019/0147318 | A1 | 5/2019 | Howard et al. | |
| 2019/0147337 | A1 | 5/2019 | Yang | |
| 2019/0171923 | A1 | 6/2019 | Chen et al. | |
| 2019/0180038 | A1* | 6/2019 | Muppalla | G06N 3/08 |
| 2019/0180177 | A1 | 6/2019 | Yim et al. | |
| 2019/0188572 | A1 | 6/2019 | Lanctot et al. | |
| 2019/0205755 | A1 | 7/2019 | Sekiyama et al. | |
| 2019/0228298 | A1* | 7/2019 | Suzuki | G06N 3/048 |
| 2020/0042362 | A1* | 2/2020 | Cui | G06V 10/82 |
| 2020/0226453 | A1 | 7/2020 | Luk et al. | |
| 2020/0226458 | A1 | 7/2020 | De Vangel et al. | |
| 2020/0264935 | A1* | 8/2020 | Poddar | G06F 9/3893 |
| 2021/0240524 | A1* | 8/2021 | Gangani | G06F 9/5061 |

OTHER PUBLICATIONS

Fang, Shaoxia, et al. "Optimizing CNN Accelerator With Improved Roofline Model." *33rd International System-on-Chip Conference (SOCC). IEEE*, 2020 (6 pages in English).

Oh, Young H., et al. "Layerweaver: Maximizing Resource Utilization of Neural Processing Units via Layer-Wise Scheduling." *International Symposium on High-Performance Computer Architecture (HPCA). IEEE*, 2021 (14 pages in English).

Extended European Search Report dated Feb. 1, 2022 in counterpart Korean Patent Application No. 21187005.0 (13 pages in English).

Park, Jongsoo, et al. "Deep learning inference in facebook data centers: Characterization, performance optimizations and hardware implications." arXiv preprint arXiv:1811.09886 (2018). (12 pages in English).

* cited by examiner

OPERATION METHOD OF HOST PROCESSOR AND ACCELERATOR, AND ELECTRONIC DEVICE INCLUDING THE SAME

CROSS-REFERENCE TO RELATED APPLICATIONS

This application claims the benefit under 35 USC § 119(a) of Korean Patent Application No. 10-2020-0115565 filed on Sep. 9, 2020, in the Korean Intellectual Property Office, the entire disclosure of which is incorporated herein by reference for all purposes.

BACKGROUND

1. Field

The following description relates to an operation method of a host processor and an accelerator, and an electronic device including the host processor and the accelerator.

2. Description of Related Art

Technologies for processing multiple batches instead of processing a single batch may not achieve an effectively low latency in a neural network-based inference service. In addition, as memory capacity and bandwidth required for a neural network have increased gradually, technologies may not effectively and rapidly process multiple batches with a limited resource.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an operation method includes: dividing a model to be executed in an accelerator into a plurality of stages; determining, for each of the stages, a maximum batch size processible in an on-chip memory of the accelerator; determining the determined maximum batch sizes to each be a candidate batch size to be applied to the model; and determining, to be a final batch size to be applied to the model, one of the determined candidate batch sizes that minimizes a sum of a computation cost of executing the model in the accelerator and a memory access cost.

The memory access cost may be determined based on a memory access cost for a weight of the model, a memory access cost for an intermediate feature map of the model, a total batch size of the model, a candidate batch size from which the memory access cost is to be calculated, and a bandwidth of an off-chip memory of the accelerator.

The memory access cost may be a cost for access to the off-chip memory of the accelerator.

The memory access cost for the intermediate feature map may be incurred in a stage, among the stages, having a maximum batch size less than the candidate batch size from which the memory access cost is to be calculated.

The memory access cost for the intermediate feature map may be determined based on a one-time memory access cost for the intermediate feature map that is incurred in the stage, the candidate batch size from which the memory access cost is to be calculated, and the maximum batch size determined for the stage.

The memory access cost for the weight may be a one-time memory access cost for weights to be applied to the model.

The computation cost may be determined based on a computation time used for the accelerator to process each of the stages, a candidate batch size from which the computation cost is to be calculated, a total batch size of the model, and a candidate batch size from which the memory access cost is to be calculated.

The computation cost may be determined based on a number of iterations to be performed by the model in processing a total batch size of the model, and a total sum of net computation time used for each task to process a candidate batch size.

The determining of the maximum batch size for each of the stages may include:
determining the maximum batch size based on a size of a weight, an input feature map, an output feature map of each stage, and a size of the on-chip memory.

The dividing may include dividing the model into the stages based on either one of a unit of computation that is processible at one time by a processing element comprised in the accelerator, and a unit of layers comprised in the model.

The method may include generating an instruction set for executing the model in the accelerator based on the final batch size.

The method may include processing, in the plurality of stages, a plurality of inputs associated with the final batch size based on the instruction set, the final batch size being a common batch size that is identically applied to the stages.

The model model may be neural network model and each of the stages may correspond to one or more layers of the neural network.

A non-transitory computer-readable storage medium may store instructions that, when executed by a processor, configure the processor to perform the method.

In another general aspect, an operation method includes: receiving an instruction set for a model to be executed in the accelerator; and processing, in a plurality of stages comprised in the model, a plurality of inputs associated with a common batch size that is identically applied to the stages, based on the instruction set, wherein, among the stages, a stage having a maximum batch size processible in an on-chip memory of the accelerator that is less than the common batch size is performed iteratively, and an intermediate feature map associated with the common batch size is transmitted to a subsequent stage of the stage.

In response to a total batch size to be processed in the model being greater than the common batch size, the stages may be performed iteratively, and inputs associated with the total batch size may be processed.

The common batch size may be determined to be one, among maximum batch sizes processible in the on-chip memory that are determined for the stages, that minimizes a sum of a computation cost of executing the model in the accelerator and a memory access cost.

The plurality of inputs may correspond feature maps, and the processing of the plurality of inputs may include generating output feature maps.

In another general aspect, an electronic device includes: a host processor configured to generate an instruction set executable by an accelerator in response to a request for executing a model in the accelerator; and an accelerator configured to process, in a plurality of stages comprised in the model, a plurality of inputs associated with a common batch size to be identically applied to the stages, in response to the instruction set being executed, wherein the host processor is configured to: determine, to be the common batch size, one that minimizes a sum of a computation cost of executing the model in the accelerator and a memory access cost, among maximum batch sizes processible in the on-chip memory that are determined for the stages.

The memory access cost may be determined based on a memory access cost for a weight of the model, a memory access cost for an intermediate feature map of the model, a total batch size of the model, and a candidate batch size from which the memory access cost is to be calculated.

The memory access cost for the intermediate feature map may be incurred in a stage, among the stages, having a maximum batch size less than the candidate batch size from which the memory access cost is to be calculated.

The memory access cost for the intermediate feature map may be determined based on a one-time memory access cost for the intermediate feature map that is incurred in the stage, the candidate batch size from which the memory access cost is to be calculated, and the maximum batch size determined for the stage.

The maximum batch size for each of the stages may be determined based on a size of a weight, an input feature map, an output feature map of each of the stages, and a size of the on-chip memory.

The stages may be determined by dividing the model based on either one of a unit of computation that is processible at one time in a processing element comprised in the accelerator, and a unit of layers comprised in the model.

In another general aspect, an operation method includes: determining, for each of a plurality of stages of a model to be executed in an accelerator, a maximum batch size processible in an on-chip memory of the accelerator; determining, as a common batch size, one of the maximum batch sizes that minimizes a sum of a computation cost of executing the model in the accelerator and a memory access cost; and generating one or more output feature maps by executing, in the accelerator, the model to which the common batch size is applied.

Other features and aspects will be apparent from the following detailed description, the drawings, and the claims.

Figure 1:
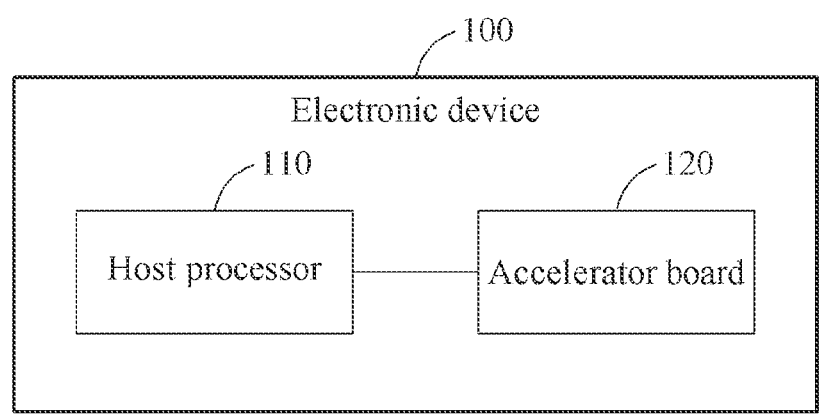
FIG. 1 illustrates an example of an electronic device.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. The terms "comprises," "includes," and "has" specify the presence of stated features, numbers, operations, members, elements, and/or combinations thereof, but do not preclude the presence or addition of one or more other features, numbers, operations, members, elements, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein.

Also, in the description of example embodiments, detailed description of structures or functions that are thereby known after an understanding of the disclosure of the present application will be omitted when it is deemed that such description will cause ambiguous interpretation of the example embodiments. Hereinafter, examples will be described in detail with reference to the accompanying drawings, and like reference numerals in the drawings refer to like elements throughout.

FIG. 1 illustrates an example of an electronic device.

Referring to FIG. 1, an electronic device 100 may include a host processor 110 and an accelerator board 120. The host processor 110 and the accelerator board 120 may communicate with each other through a bus, a network on chip (NoC), a peripheral component interconnect express (PCIe), and the like.

The host processor 110 may be a device configured to control respective operations of components included in the electronic device 100 and may include a central processing unit (CPU), for example. The host processor 110 may receive at least one request for processing a neural network in the accelerator board 120 and generate an instruction set executable in the accelerator board 120 in response to the received request. The request may be made for a neural network-based data inference, and for obtaining a result of the data inference by allowing the accelerator board 120 to execute the neural network for object recognition, pattern recognition, computer vision, speech recognition, machine translation, machine interpretation, recommendation services, personalized services, image processing, autonomous driving, and/or the like. The generating of the instruction set may be performed by the host processor 110 only once in advance before an inference is performed in the accelerator board 120. When an actual request for an inference is received from a user, the instruction set generated in advance may be executed in the accelerator board 120.

The host processor 110 may divide the neural network to be executed in the accelerator board 120 into a plurality of stages. The host processor 110 may determine, for each of the stages, a maximum batch size executable in an on-chip memory of the accelerator board 120. The host processor 110 may determine, to be a candidate batch size to be applied to the neural network, the maximum batch size that is determined for each of the stages as described in the foregoing. The host processor 110 may determine, to be a final batch size, one among the determined candidate batch sizes by which a sum of a computation cost and a memory access cost is minimized. Here, the computation cost may be a cost that is incurred when the neural network is executed in an accelerator. The host processor 110 may then generate the instruction set for executing the neural network in the accelerator based on the determined final batch size. In an example, a batch may include an input feature map (IFM) and a corresponding output feature map (OFM) for a given task and/or layer, and a batch size may be a number of batches.

The accelerator board 120 may be an artificial intelligence (AI) accelerator configured to execute the neural network according to the instruction set of the host processor 110 and perform an inference on input data, and may be a separate processor distinguished from the host processor 110. The accelerator board 120 may be, for example, a neural processing unit or neural processor (NPU), a graphics processing unit (GPU), a tensor processing unit (TPU), a digital signal processor (DSP), and the like. The accelerator board 120 may be a separate dedicated processor that processes a task more effectively than by the host processor 110 used for general purposes, based on the characteristics of operations of the neural network.

The neural network may include a plurality of layers. In an example, the neural network may include an input layer, a plurality of hidden layers, and an output layer. Each of the layers may include a plurality of nodes. Each of the nodes may indicate a computation unit having at least one input and output, and the nodes may be connected to one another. A weight may be set for a connection between nodes and be adjusted or changed. The weight may determine the influence of a related data value on a final result by increasing, decreasing, or maintaining the data value. To each node included in the output layer, weighted inputs of nodes included in a previous layer may be input. A process in which weighted data is input from a layer to a subsequent layer of the layer may be referred to as propagation.

In the accelerator board 120, there may be a plurality of sets of data which is a target for an inference. In such a case, a batch processing method of one or more embodiments that performs an inference on a plurality of sets of data all at once may be used to improve an inference operation efficiency. Here, by determining the number of batches (or also referred to herein as a batch number) based on a computation resource and a memory access resource, the batch processing method of one or more embodiments may enable batch processing optimized for the accelerator board 120.

The accelerator board 120 may also be referred to herein as an accelerator, and the neural network may also be referred to herein as a model, for the convenience of description.

Figure 2:
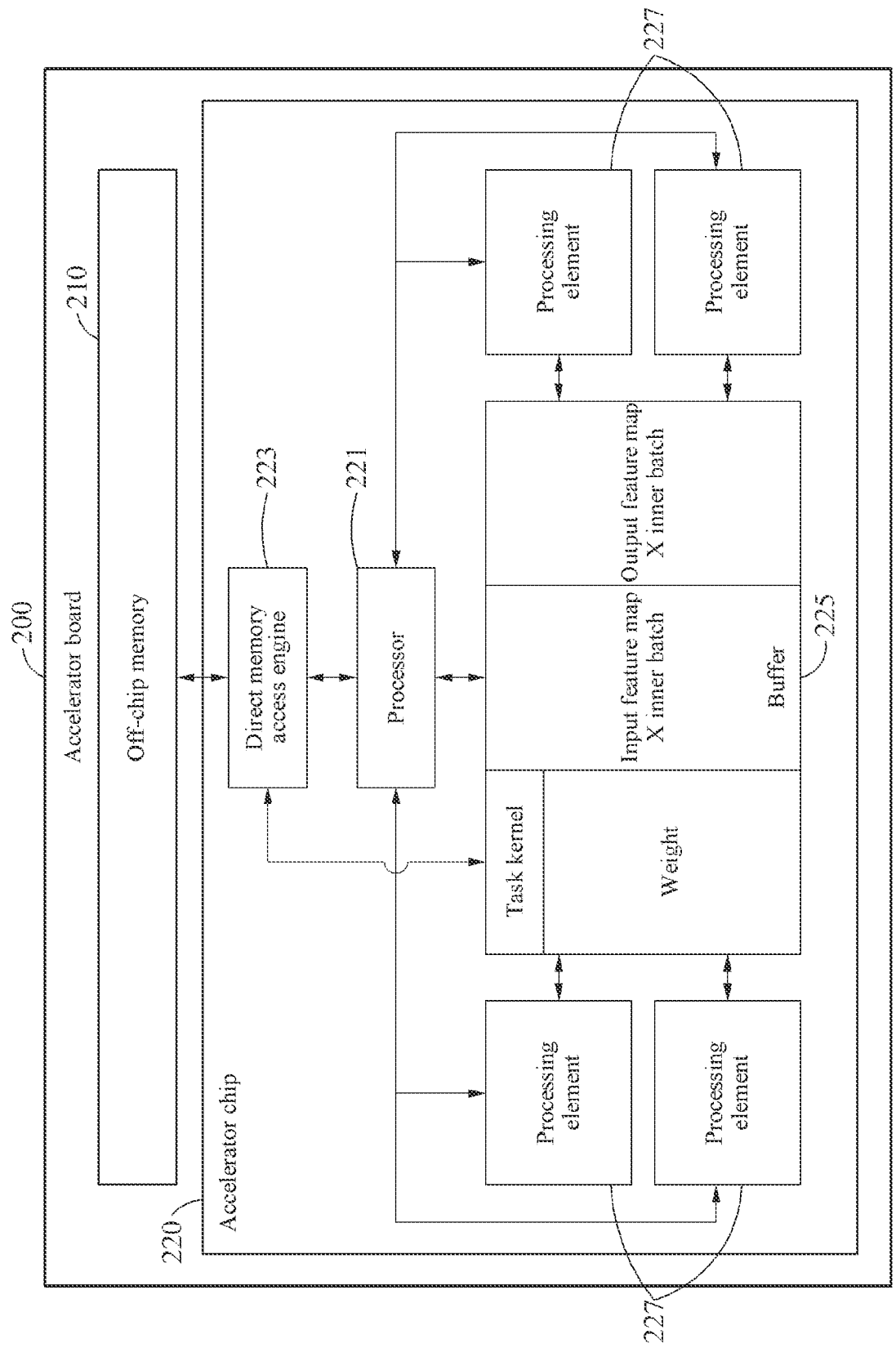
FIG. 2 illustrates an example of an accelerator board.

FIG. 2 illustrates an example of an accelerator board.

Referring to FIG. 2, an accelerator board 200 may include an off-chip memory 210 and an accelerator chip 220. The accelerator chip 220 may include a processor 221, a direct memory access (DMA) engine 223, a buffer 225, and a plurality of computation units or processing elements (PEs) 227.

The off-chip memory 210 may be a memory disposed outside the accelerator chip 220 and may include, for example, a dynamic random-access memory (DRAM). The off-chip memory 210 may store target inference data and/or parameters of a neural network to be executed in the accelerator chip 220, and such stored data may be transmitted to the accelerator chip 220 for subsequently performing an inference. The off-chip memory 210 may be used in a case in which an on-chip memory inside the accelerator chip 220 is not sufficient to execute the neural network in the accelerator chip 220.

The off-chip memory 210 may have a larger memory capacity than the on-chip memory in the accelerator chip 220. However, a cost of the accelerator chip 220 accessing the off-chip memory 210 may be greater than a cost of accessing to the on-chip memory. Thus, for a fast inference when the neural network is executed in the accelerator chip 220, the accelerator board 200 of one or more embodiments may reduce the cost for access to the off-chip memory 210. Such a memory access cost may indicate an amount of power and/or time that is required for accessing a memory and then reading or writing data from or in the memory.

The accelerator chip 220 may be a separate dedicated processor that processes a task more effectively than by a host processor used for general purposes, based on the characteristics of operations of the neural network. Here, one or more PEs 227 and the on-chip memory that are included in the accelerator chip 220 may be used.

The on-chip memory may be a device that includes a global shared buffer and/or a local buffer in the accelerator chip 220, and may be distinguished from the off-chip memory 210 disposed outside the accelerator chip 220. The on-chip memory may include, for example, a scratchpad memory accessible through an address space, a static random-access memory (SRAM), and the like.

In the example of FIG. 2, the on-chip memory may be, or may be indicated as, the buffer 225. The buffer 225 may include a task kernel in which an operation of a task is defined, a weight to be applied to the task, an input feature map (IFM), and an output feature map (OFM). Here, as many IFMs and OFMs as a batch size to be processed in the task may be stored in the buffer 225. An operation of loading data onto the buffer 225 or outputting data from the buffer 225 may be controlled by the DMA engine 223.

The processor 221 may control data movement of the DMA engine 223 and/or computation processing of the PEs 227 based on the operation defined in the task kernel.

The PEs 227 may perform computation or operations based on the neural network (for example, a multiply-accumulate (MAC) operation).

In an example, the accelerator board 200 may perform batch processing based on an instruction set from the host processor 110 of FIG. 1. Hereinafter, non-limiting examples of determining an optimal batch number will be described in detail with reference to the accompanying drawings.

Figure 3:
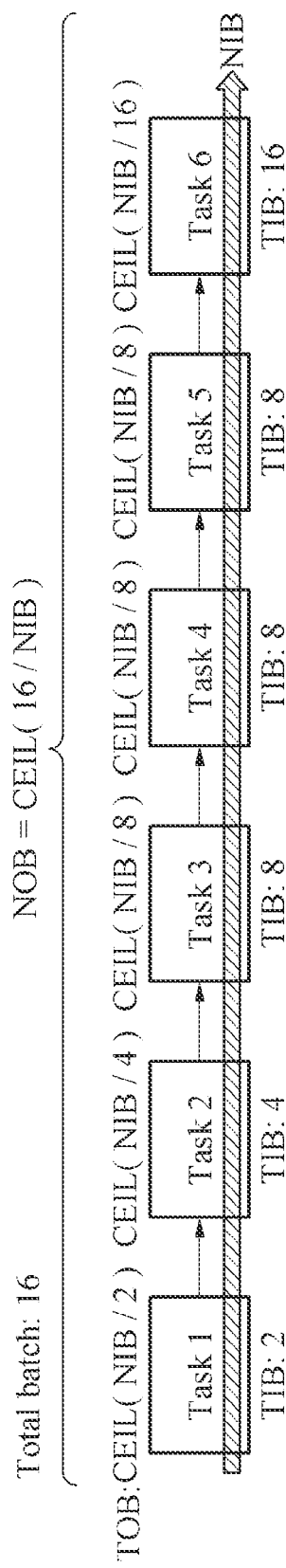
FIGS. 3 and 4 illustrate examples of determining the number of batches to be applied to a model.
Figure 4:
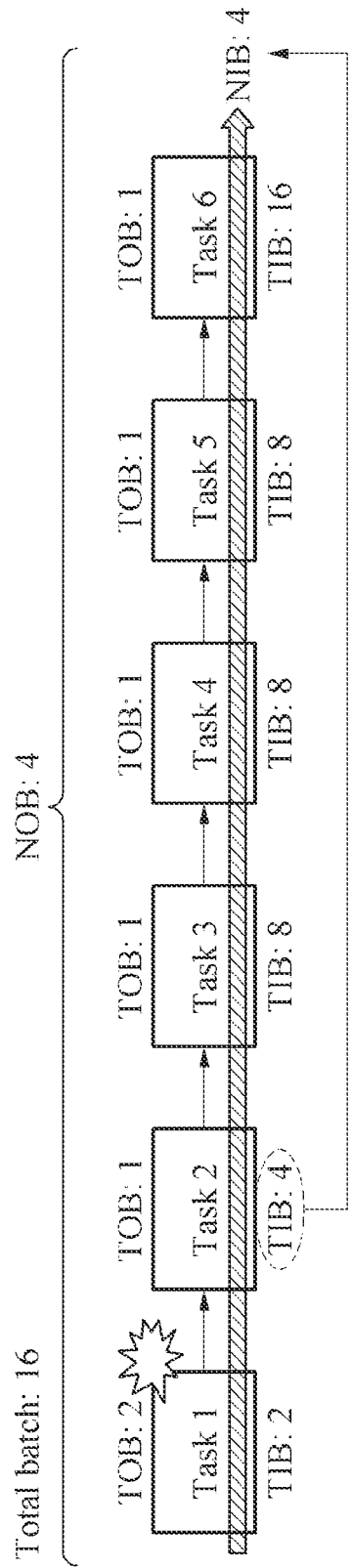

FIGS. 3 and 4 illustrate examples of determining a batch number to be applied to a model.

Referring to FIG. 3, a model to be executed in an accelerator may be divided into a plurality of stages. Each of the stages may be a unit of computation that is processible at one time in a PE included in the accelerator, or a unit of layers (or layer unit) included in the model. The unit of computation that is processible in a PE at one time may also be referred to herein as a task or task unit. A single task may correspond to a single layer included in the model, or may be less than or greater than a single layer. By dividing the model by a task unit and performing batch processing, the operation method of one or more embodiments may maintain a high level of utilization of a PE. Each task may occupy a resource of the accelerator at a time at which each task is executed, and may be processed. As described above, the model may be divided into the stages based on a task unit or a layer unit. Hereinafter, an example of the model being divided into the stages based on a task unit will be mainly described for the convenience of description. In the example of FIG. 3, the model is divided into six tasks. However, the following description is not provided to limit the model, but is also applicable to various numbers of tasks or layers, and the model may be divided into any number of tasks, according to other examples.

For each of the tasks, a maximum batch size processible in an on-chip memory of the accelerator may be determined. The maximum batch size may be determined for each task by considering that a size of an input feature map (IFM), a weight, and an output feature map (OFM) used for each task may differ from task to task, and the weight may be reused even when a plurality of batch sizes is determined and thus the weight may be set consistently regardless of a batch size, whereas a total size of the input feature map and the output feature map may vary depending on the batch size. The maximum batch size may also be referred to herein as a task-inner batch (TIB).

A TIB of each task may be determined to be a maximum batch number that satisfies 'weight+(IFM+OFM)×batch<on-chip memory.' That is, a maximum batch size of a task may be determined such that a product of multiplication between a sum of a size of an input feature map and a size of an output feature map and the maximum batch size of the task does not exceed a value obtained by subtracting a magnitude of a weight from a size of the on-chip memory. That is, 'batch' may be a maximum number such that '(IFM+OFM)×batch' does not exceed 'on-chip memory−weight'. For example, for a task having a TIB that is greater than a total batch size to be input, the TIB for the task may be set to be the same as the total batch size.

As described above, since an access cost for an off-chip memory is greater than an access cost for an on-chip memory, the operation method of one or more embodiments may maximally prevent the access to the off-chip memory by determining a maximum batch size processible in the on-chip memory for each task.

In some cases, when the model is divided by a layer unit, the maximum batch size may also be referred to as a layer-inner batch (LIB). The LIB for each layer may be determined to be a maximum batch number that satisfies 'weight+(IFM+OFM)×batch≤on-chip memory.'

In addition, a common batch size that all tasks process in order to process a subsequent task in a state in which intermediate feature maps generated from each task are maximally retained in the on-chip memory may be determined. The common batch size may also be referred to herein as a network-inner batch (NIB) because it is applied to an entire network including a plurality of tasks.

The NIB may be a batch size of an intermediate feature map (IMFM) that is to be generated in each task. A task having a TIB greater than or equal to the NIB may generate intermediate feature maps corresponding to the NIB and transmit the generated intermediate feature maps to a subsequent task in the on-chip memory. However, a task having a TIB less than the NIB may not store all intermediate feature maps generated corresponding to the NIB in the on-chip memory, and may thus use the off-chip memory. A subsequent task may then need to load the intermediate feature maps from the off-chip memory, and thus off-chip memory access may occur. Thus, the operation method of one or more embodiments may avoid or reduce such off-chip memory access by obtaining an NIB that is optimal for the model.

The TIB determined for each of the tasks may be determined to be a candidate NIB to be applied to the model. From among candidate NIBs, one with a least latency may be selected as a final NIB. That is, among the candidate NIBs, one that minimizes a sum of a computation cost incurred when the model is executed in the accelerator and a memory access cost may be determined to be the final NIB. A cost for each candidate NIB may be represented by Equation 1 below, for example.

$$\text{Cost(NIB)}=\text{Memory\_cost(NIB)}+\text{Computation\_cost(NIB)} \qquad \text{Equation 1:}$$

In Equation 1, Cost(NIB) denotes a cost for a candidate NIB. Memory_cost(NIB) denotes a memory access cost for the candidate NIB. Computation_cost(NIB) denotes a computation cost for the candidate NIB.

The computation cost may be determined to be a total sum of net computation time used for each task to process a candidate NIB, and be represented by Equation 2 below, for example.

$$\text{Computation\_cost}(\ ) = \text{SUM}(\text{comp\_time\_per\_task} \times \text{NIB}) \times \text{NOB} \quad \text{Equation 2:}$$

In Equation 2, a network-outer batch (NOB) indicates the number of iterations of the model to process a total batch (a total batch size of the model, for example), which may be determined to be CEIL (total batch/NIB). CEIL denotes a function that returns an integer obtained by rounding off to the nearest whole number. For example, CEIL(x) maps x to the least integer greater than or equal to x.

The memory access cost may be an access cost for access to the off-chip memory, and be classified into a memory access cost for a weight of each task, and a memory access cost for an intermediate feature map. The memory access cost may be represented by Equation 3 below, for example.

$$\text{Memory\_cost}(\ ) = (\text{cost}(\text{weight\_access}) + \text{cost}(\text{IMFM\_access})) \times \text{NOB} \times \text{I/Bandwidth} \quad \text{Equation 3:}$$

In Equation 3, Bandwidth denotes a bandwidth of the off-chip memory of the accelerator. When the model is performed once, a batch corresponding to an NIB may be processed, and thus the model may need to be performed iteratively by the number of times corresponding to an NOB to process all batches. The memory access cost may be incurred each time the model is executed, and may thus be determined by multiplication between the NOB and a sum of a memory access cost for a weight and a memory access cost for an intermediate feature map.

Even though a task having a TIB less than a candidate NIB may be performed iteratively to process a batch corresponding to an NIB, a same weight may be used, and thus the memory access cost for a weight may be irrespective of the number of iterative processing of the task, but may be affected by iterative performance of the model by the NOB. The memory access cost for a weight may be represented by Equation 4 below, for example.

$$\text{cost}(\text{weight\_access}) = \text{Total\_weight} \quad \text{Equation 4:}$$

In a case of the memory access cost for an intermediate feature map, for a task having a TIB less than a candidate NIB to process as many batches as an NIB, an intermediate feature map may be stored in the off-chip memory and an access cost for the off-chip memory may thus be incurred. In contrast, a task having a TIB greater than or equal to a candidate NIB may process as many batches as the NIB only with the on-chip memory, and thus access to the off-chip memory may not occur. The memory access cost for an intermediate feature map may be represented by Equation 5 below, for example.

$$\text{Cost}(\text{IMFM\_access}) = \text{Task\_IMFM} \times \text{TOB}, \text{ where TIB} < \text{NIB} \quad \text{Equation 5:}$$

In Equation 5, a task-outer batch (TOB) denotes the number of times of iterative performance for each task to process as many batches as an NIB, and may be determined to be CEIL(NIB/TIB). Once the task is performed, as many batches as a TIB may be processed. Thus, to process as many batches as a total NIB, the task may be iteratively performed by the TOB. For example, when the TOB is greater than or equal to 2, the TIB of the task is less than the NIB, and thus an access cost for the off-chip memory may be incurred. In this example, the memory access cost may be determined by a product of multiplication between a size of an intermediate feature map generated in the task and the TOB.

In a case in which the model is divided by a layer unit, a layer may be iteratively performed as many times as a layer-outer batch (LOB). The LOB may be determined to be CEIL(NIB/LIB).

The foregoing costs may be determined for each candidate TIB, and a TIB having a smallest cost may be determined to be a final TIB and applied to the model. Thus, the operation method of one or more embodiments may minimize off-chip memory access during an inference and enable a fast inference by considering a computation cost.

FIG. 4 illustrates an example of determining a final NIB when processing an input on a total of 16 batches. Detailed numerals illustrated in FIG. 4 are provided for the convenience of description, and thus examples are not limited thereto.

One of candidate NIBs corresponding to TIBs may be determined to be a final NIB. In the example of FIG. 4, candidate NIBs are 2, 4, 8, and 16 excluding duplicate TIBs. A cost for each of the candidate NIBs may be calculated, and a candidate NIB having a smallest cost may be determined to be the final NIB to be applied to a model.

In the example of FIG. 4, the final NIB is determined to be 4. Task 1 has a TIB which is 2, and thus may load two inputs onto an on-chip memory and process once. Also, a TOB of Task 1 is 2, and thus Task 1 may be performed twice and a total of 4 output feature maps (or intermediate feature maps) may be generated. In this example, an access cost for an off-chip memory may be incurred. In a case of Tasks 2 through 6, a TIB of each may be greater than or equal to the final NIB, and thus it is possible to process 4 batches only with an on-chip memory without the off-chip memory access. By performing iteratively such a process four times that correspond to the NOB, a total of 16 batches may all be processed.

Tasks 2 through 6 may process batches less than a maximum batch size processible in the on-chip memory, insufficiently use an accelerator resource, and thus may seem to need to iterate the model more. However, as described above with reference to FIG. 3, by comprehensively considering a computation cost in addition to the memory access cost when calculating a cost for an NIB, the operation method of one or more embodiments may determine a greater final NIB to reduce iterative performance of the model, and prevent a drastic increase in the memory access cost for the off-chip memory from being added to a total cost. Thus, the operation method of one or more embodiments may obtain an optimal NIB.

A host processor may set a memory address of data needed for an inference based on a determined TIB, NIB, TOB, and NOB, and record the set memory address in metadata of an instruction set, and transmit it to an accelerator. A firmware in the accelerator may execute the model iteratively based on such received information, and thus all batches may be processed.

Figure 5:
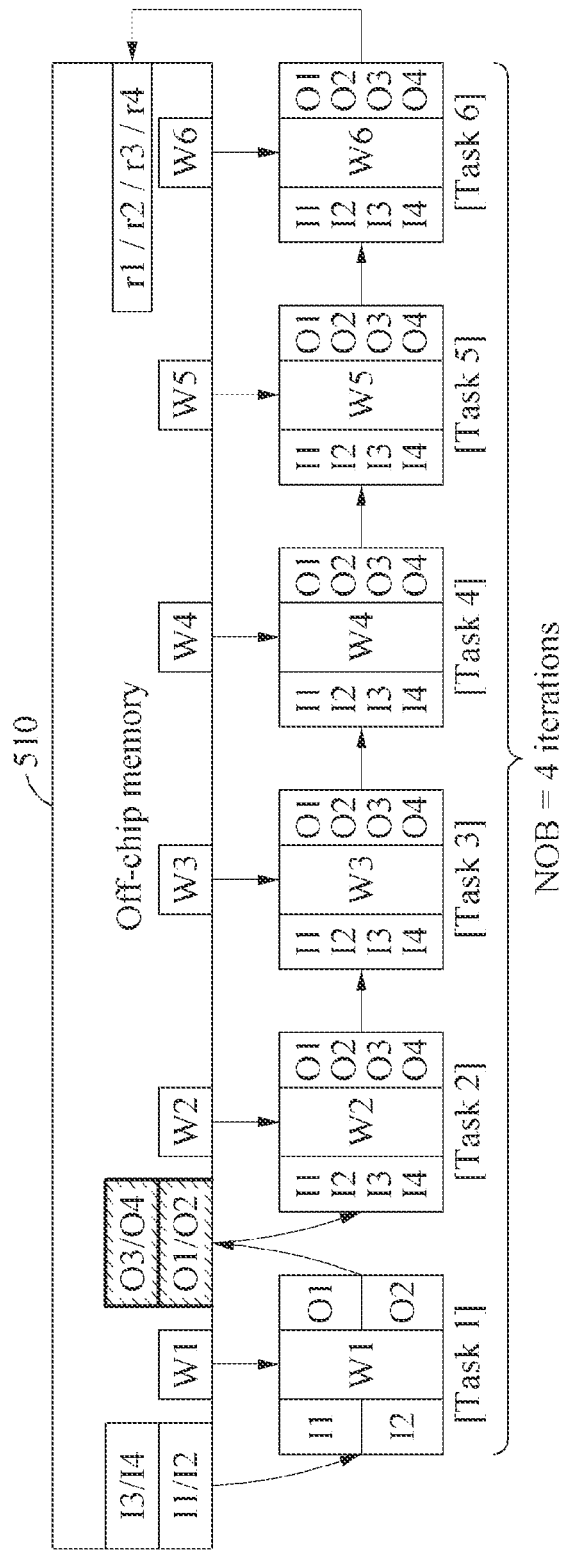
FIG. 5 illustrates an example of a batch processing-based inference process.

FIG. 5 illustrates an example of a batch processing-based inference process.

Hereinafter, non-limiting examples of how data moves by batch processing when an accelerator performs an inference will be described in detail. In the example of FIG. 5, each task box indicates sets of data to be stored in an on-chip memory in a corresponding task stage.

Referring to FIG. 5, a final NIB is determined to be 4, and thus each task may need to process an input on four batches. As illustrated, a TIB of Task 1 is 2, and thus two inputs (or batches) may be processed first and a result therefrom may be stored in an off-chip memory 510, and then subsequent two inputs may be processed. Thus, an access cost for the off-chip memory 510 may be incurred. Remaining Tasks 2 through 6 may process an input on four batches at once, and thus access to the off-chip memory 510 may not occur. Thus, an execution speed may increase. Since the four batches are processed through such one-time execution of Tasks 1 through 6, the execution of Tasks 1 through 6 may be iterated four times to process a total of 16 batches.

Figure 6:
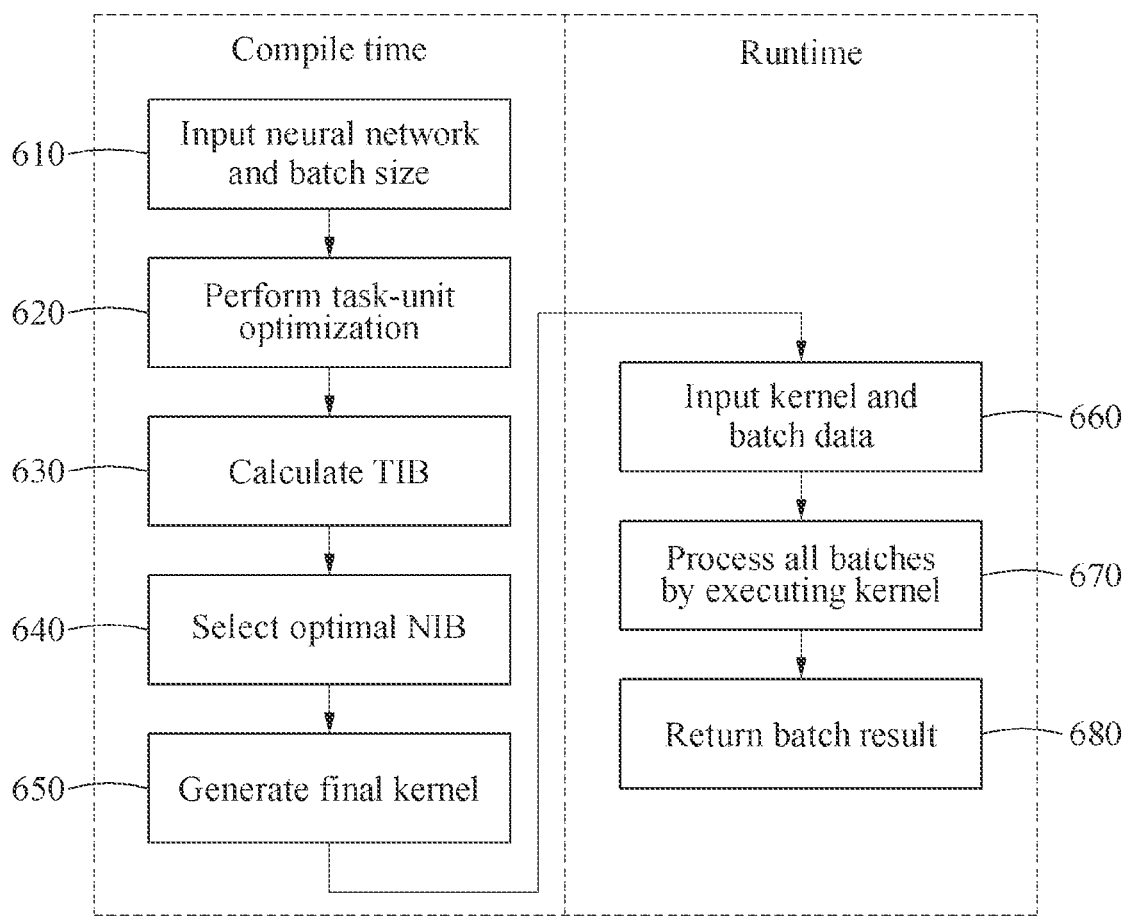
FIG. 6 illustrates an example of an operation in a compile time and an example of an operation in a runtime.

FIG. 6 illustrates an example of an operation in a compile time and an example of an operation in a runtime.

Hereinafter, non-limiting example of how a host processor operates in a compile time and an accelerator operates in a runtime will be described in detail.

Referring to FIG. 6, in operation 610, the host processor may receive, as an input, information associated with a neural network to be executed in the accelerator and a total batch size to be processed. The information associated with the neural network may include the number of layers and nodes included in the neural network, a weight, and the like. In addition, the host processor may receive, as an input, hardware information associated with a computation resource of the accelerator, a memory access resource, and the like.

In operation 620, the host processor may perform task-unit optimization by dividing the neural network into tasks. According to examples, an optimization technique, such as, for example, tiling, vectorization, and tensorization may be performed.

In operation 630, the host processor may calculate a TIB that is a maximum batch size processible in an on-chip memory for each of the tasks.

In operation 640, the host processor may select, as an optimal NIB, one that minimizes a latency from among TIBs obtained through the calculating in operation 630.

In operation 650, the host processor may generate a kernel that is an instruction set for executing the neural network in the accelerator based on the optimal NIB.

In operation 660, the accelerator may receive, as an input, the kernel generated by the host processor and batch data that is a target for an inference.

In operation 670, the accelerator may process an input on total batches by executing the kernel and performing batch processing based on the optimal NIB.

In operation 680, the accelerator may return a batch result as an inference result.

Figure 7:
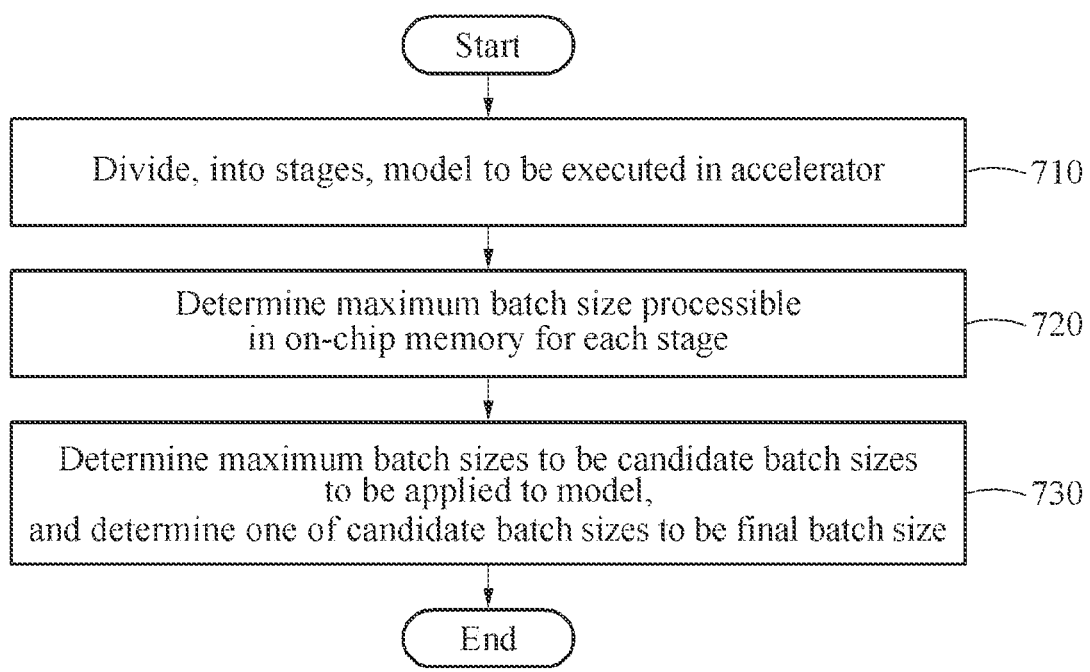
FIG. 7 illustrates an example of an operation method of a host processor.

FIG. 7 illustrates an example of an operation method of a host processor.

Referring to FIG. 7, in operation 710, a host processor may divide a model to be executed in an accelerator into a plurality of stages. In operation 720, the host processor may determine a maximum batch size processible in an on-chip memory of the accelerator for each of the stages. In operation 730, the host processor may determine the determined maximum batch size of each of the stages to be a candidate batch size to be applied to the model and determines, to be a final batch size, one that minimizes a sum of a computation cost incurred when the model is executed in the accelerator and a memory access cost, among the determined candidate batch sizes.

For a more detailed description of the operations described above with reference to FIG. 7, reference may be made to what has been described above with reference to FIGS. 1 through 6, and thus a more detailed and repeated description will be omitted here for brevity.

Figure 8:
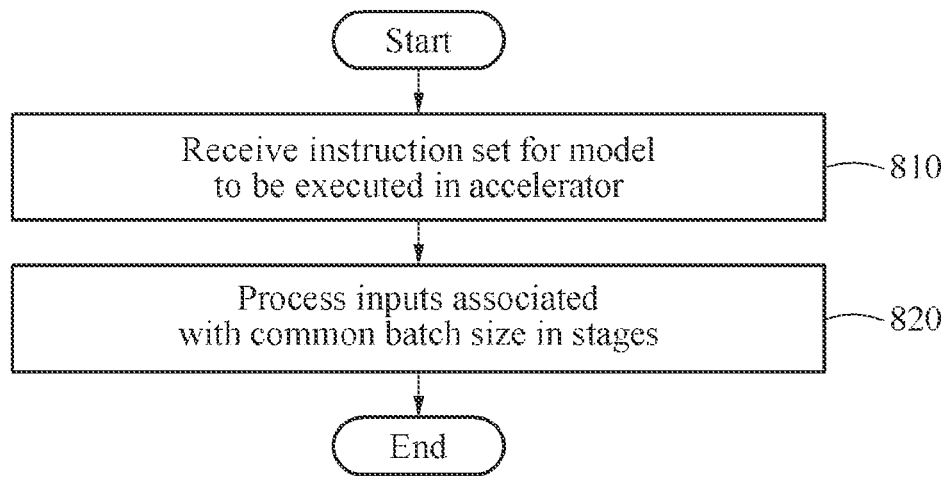
FIG. 8 illustrates an example of an operation method of an accelerator.

FIG. 8 illustrates an example of an operation method of an accelerator.

Referring to FIG. 8, in operation 810, an accelerator may receive an instruction set for a model to be executed. In operation 820, the accelerator may process, in a plurality of stages included in the model, a plurality of inputs associated with a common batch size that is applied identically to the stages, based on the instruction set. Here, among the stages, a stage having a maximum batch size processible in an on-chip memory of the accelerator that is smaller than the common batch size may be performed iteratively, and an intermediate feature map associated with the common batch size may be transmitted to a subsequent stage.

For a more detailed description of the operations described above with reference to FIG. 8, reference may be made to what has been described above with reference to FIGS. 1 through 6, and thus a more detailed and repeated description will be omitted here for brevity.

According to example embodiments described herein, it is possible to effectively optimize and process a batch input using a neural processor, and minimize access to an off-chip memory by effectively using an on-chip memory and effectively reduce an overall latency. In addition, it is possible to effectively reduce an inference time by reducing the unnecessary use of the off-chip memory.

Figure 9:
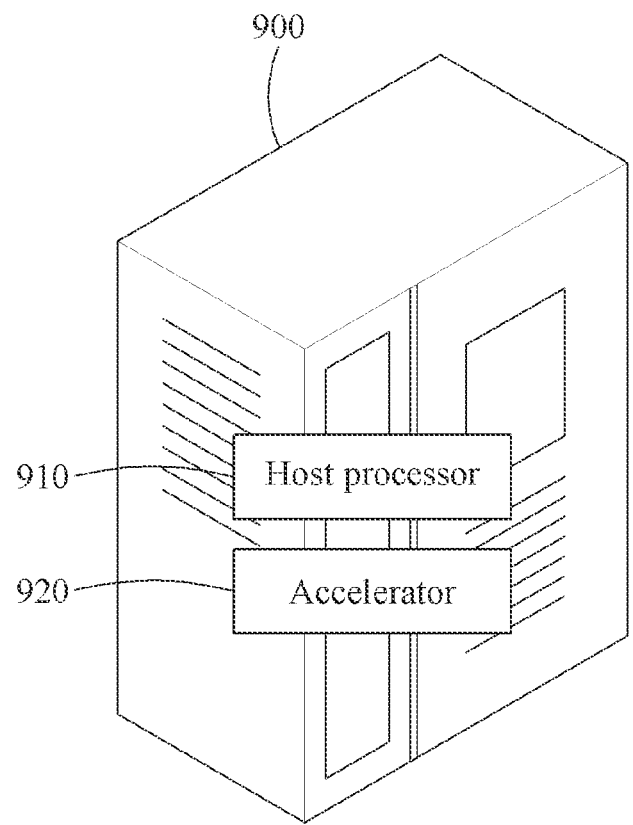
FIGS. 9 and 10 illustrate examples of an electronic device.
Figure 10:
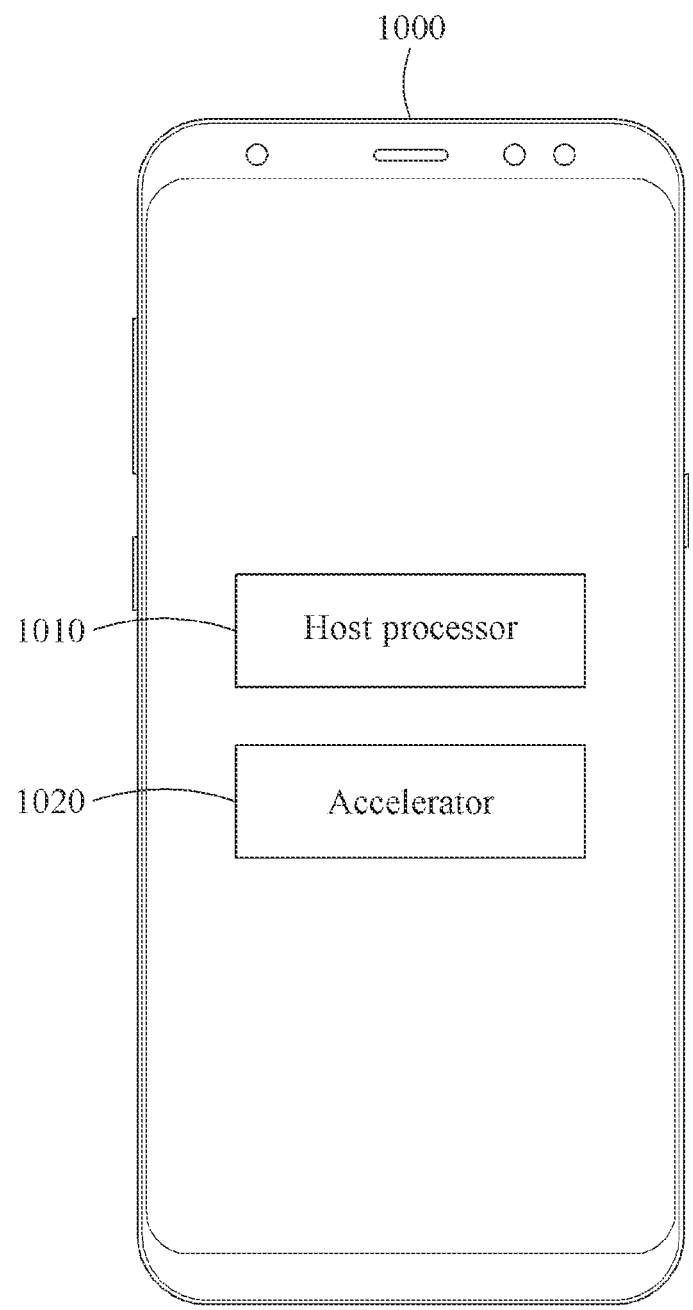

FIGS. 9 and 10 illustrate examples of an electronic device.

Referring to FIG. 9, an electronic device may be embodied as a server 900 including a host processor 910 and an accelerator 920.

The server 900 may refer to a separate device distinguished from a user terminal controlled by a user, and may communicate with one or more user terminals through a wired and/or wireless network. The server 900 may receive requests for inference execution that are simultaneously transmitted from multiple users through their user terminals. The host processor 910 may generate an instruction set for optimal NIB-based batch processing when executing a model in the accelerator 920. The accelerator 920 may rapidly perform an inference on multiple inputs through the batch processing based on the instruction set generated by the host processor 910. The server 900 may return inference results to corresponding user terminals. The user terminals described herein may include, for example, a computing device such as a smartphone, a personal computer (PC), a tablet PC, and a laptop, a wearable device such as a smart watch and smart eyeglasses, a home appliance such as a smart speaker, a smart TV, and a smart refrigerator, and/or other devices such as a smart vehicle, a smart kiosk, and/or an Internet of things (IoT) device.

Referring to FIG. 10, an electronic device may be embodied as a user terminal 1000 including a host processor 1010 and an accelerator 1020. Although the user terminal 1000 is illustrated as a smartphone in FIG. 10 for the convenience of description, any device that is controlled by a user may be applicable unconstrainedly. The user terminal 1000 may obtain requests for inference execution directly from a user, and process multiple inputs in the accelerator 1020 through batch processing based on an instruction set determined by the host processor 1010. The user terminal 1000 may simply provide inference results to the user, or perform a subsequent operation based on the inference results.

The host processors, accelerators, electronic devices, accelerator boards, off-chip memories, accelerator chips, processors, DMA engines, buffers, PEs, off-chip memories, servers, user terminals, electronic device 100, host processor 110, accelerator board 120, accelerator board 200, off-chip memory 210, accelerator chip 220, processor 221, DMA engine 223, buffer 225, PEs 227, off-chip memory 510, server 900, host processor 910, accelerator 920, user terminal 1000, host processor 1010, accelerator 1020, and other apparatuses, devices, units, modules, and components described herein with respect to FIGS. 1-10 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-10 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. An operation method, comprising:
    dividing a model to be executed in an accelerator into a plurality of stages;
    for each of the stages, determining, based on a size of an on-chip memory of the accelerator, a maximum batch size processible in the on-chip memory;
    determining the determined maximum batch sizes to each be a candidate batch size to be applied to the model;
    determining, to be a final batch size to be applied to the model, one of the determined candidate batch sizes that minimizes a sum of a computation cost of executing the model in the accelerator and a memory access cost; and
    processing a plurality of inputs associated with the final batch size by executing the model in the accelerator using an instruction set generated based on the final batch size.

2. The method of claim 1, wherein the memory access cost is determined based on a memory access cost for a weight of the model, a memory access cost for an intermediate feature map of the model, a total batch size of the model, a candidate batch size from which the memory access cost is to be calculated, and a bandwidth of an off-chip memory of the accelerator.

3. The method of claim 2, wherein the memory access cost is a cost for access to the off-chip memory of the accelerator.

4. The method of claim 2, wherein the memory access cost for the intermediate feature map is incurred in a stage, among the stages, having a maximum batch size less than the candidate batch size from which the memory access cost is to be calculated.

5. The method of claim 4, wherein the memory access cost for the intermediate feature map is determined based on a one-time memory access cost for the intermediate feature map that is incurred in the stage, the candidate batch size from which the memory access cost is to be calculated, and the maximum batch size determined for the stage.

6. The method of claim 2, wherein the memory access cost for the weight is a one-time memory access cost for weights to be applied to the model.

7. The method of claim 1, wherein the computation cost is determined based on a computation time used for the accelerator to process each of the stages, a candidate batch size from which the computation cost is to be calculated, a total batch size of the model, and a candidate batch size from which the memory access cost is to be calculated.

8. The method of claim 1, wherein the computation cost is determined based on a number of iterations to be performed by the model in processing a total batch size of the model, and a total sum of net computation time used for each task to process a candidate batch size.

9. The method of claim 1, wherein the determining of the maximum batch size for each of the stages comprises:
    determining the maximum batch size based on a size of a weight, an input feature map, an output feature map of each stage, and a size of the on-chip memory.

10. The method of claim 1, wherein the dividing comprises dividing the model into the stages based on either one of
    a unit of computation that is processible at one time by a processing element comprised in the accelerator, and
    a unit of layers comprised in the model.

11. The method of claim 1, further comprising:
    generating the instruction set for executing the model in the accelerator based on the final batch size.

12. The method of claim 11, wherein the processing comprises processing, in the plurality of stages, the plurality of inputs associated with the final batch size based on the instruction set, the final batch size being a common batch size that is identically applied to the stages.

13. The method of claim 1, wherein the model is neural network model and each of the stages corresponds to one or more layers of the neural network.

14. A non-transitory computer-readable storage medium storing instructions that, when executed by a processor, configure the processor to perform the method of claim 1.

15. An operation method, comprising:
    receiving an instruction set for a model to be executed in the accelerator; and
    processing, in a plurality of stages comprised in the model, a plurality of inputs associated with a common batch size that is identically applied to the stages, by executing the model in the accelerator using the instruction set,
    wherein, among the stages, a stage having a maximum batch size processible in an on-chip memory of the accelerator that is less than the common batch size is performed iteratively, and an intermediate feature map associated with the common batch size is transmitted to a subsequent stage of the stage.

16. The method of claim 15, wherein, in response to a total batch size to be processed in the model being greater than the common batch size, the stages are performed iteratively, and inputs associated with the total batch size are processed.

17. The method of claim 15, wherein the common batch size is determined to be one, among maximum batch sizes processible in the on-chip memory that are determined for the stages, that minimizes a sum of a computation cost of executing the model in the accelerator and a memory access cost.

18. The method of claim 15, wherein the plurality of inputs correspond feature maps, and the processing of the plurality of inputs comprises generating output feature maps.

19. An electronic device comprising:
    a host processor configured to generate an instruction set executable by an accelerator in response to a request for executing a model in the accelerator; and
    an accelerator configured to process, in a plurality of stages comprised in the model, a plurality of inputs associated with a common batch size to be identically applied to the stages, in response to the model being executed in the accelerator using the instruction set,
    wherein the host processor is configured to:
    determine, to be the common batch size, one that minimizes a sum of a computation cost of executing the model in the accelerator and a memory access cost, among maximum batch sizes processible in the on-chip memory that are determined for the stages.

20. The device of claim 19, wherein the memory access cost is determined based on a memory access cost for a weight of the model, a memory access cost for an intermediate feature map of the model, a total batch size of the model, and a candidate batch size from which the memory access cost is to be calculated.

21. The device of claim 20, wherein the memory access cost for the intermediate feature map is incurred in a stage, among the stages, having a maximum batch size less than the candidate batch size from which the memory access cost is to be calculated.

22. The device of claim 21, wherein the memory access cost for the intermediate feature map is determined based on a one-time memory access cost for the intermediate feature map that is incurred in the stage, the candidate batch size from which the memory access cost is to be calculated, and the maximum batch size determined for the stage.

23. The device of claim 19, wherein the maximum batch size for each of the stages is determined based on a size of a weight, an input feature map, an output feature map of each of the stages, and a size of the on-chip memory.

24. The device of claim 19, wherein the stages are determined by dividing the model based on either one of a unit of computation that is processible at one time in a processing element comprised in the accelerator, and a unit of layers comprised in the model.

25. An operation method, comprising:
for each of a plurality of stages of a model to be executed in an accelerator, determining, based on a size of an on-chip memory of the accelerator, a maximum batch size processible in the on-chip memory;
determining, as a common batch size, one of the maximum batch sizes that minimizes a sum of a computation cost of executing the model in the accelerator and a memory access cost; and
generating one or more output feature maps by executing, in the accelerator, the model to which the common batch size is applied using an instruction set generated based on the common batch size.

\* \* \* \* \*